United States Patent
Fontaine et al.

(10) Patent No.: US 9,151,407 B2
(45) Date of Patent: Oct. 6, 2015

(54) VALVE CAGE HAVING ZERO DEAD BAND BETWEEN NOISE ABATEMENT AND HIGH CAPACITY FLOW SECTIONS

(71) Applicant: FISHER CONTROLS INTERNATIONAL LLC, Marshalltown, IA (US)

(72) Inventors: Mike Fontaine, Marshalltown, IA (US); Justin Paul Goodwin, Marshalltown, IA (US); Joshua Charles Crompton, Beaman, IA (US); Aaron Steven McGregor, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 138 days.

(21) Appl. No.: 14/023,695

(22) Filed: Sep. 11, 2013

(65) Prior Publication Data

US 2014/0124055 A1 May 8, 2014

Related U.S. Application Data

(60) Provisional application No. 61/721,773, filed on Nov. 2, 2012.

(51) Int. Cl.
*F16K 47/04* (2006.01)
*F16K 47/08* (2006.01)

(52) U.S. Cl.
CPC ............... *F16K 47/04* (2013.01); *F16K 47/08* (2013.01); *Y10T 137/7043* (2015.04); *Y10T 137/86734* (2015.04); *Y10T 137/86759* (2015.04); *Y10T 137/86791* (2015.04)

(58) Field of Classification Search
CPC ......... F16K 47/04; F16K 47/08; F16K 47/02; F16K 47/00; F16K 3/32; F16K 3/34; F16K 1/52; Y10T 137/86734; Y10T 137/86759; Y10T 137/86718; Y10T 137/86807; Y10T 137/86799; Y10T 137/86791; Y10T 137/87555; Y10T 137/87539; Y10T 137/7043

USPC ............... 137/625.3, 625.33, 625.28, 625.39, 137/625.38, 625.37, 601.2, 601.18; 251/118; 138/40, 43

See application file for complete search history.

(56) References Cited

U.S. PATENT DOCUMENTS

| | | | |
|---|---|---|---|
| 4,397,331 A | 8/1983 | Medlar | |
| 2001/0031189 A1* | 10/2001 | Gethmann | 411/338 |

(Continued)

FOREIGN PATENT DOCUMENTS

| | | | | |
|---|---|---|---|---|
| FR | 2249271 A1 | 5/1975 | | |
| WO | WO-01/31242 A1 | 5/2001 | | |
| WO | WO 2011/118863 | * 9/2011 | ............... | F16K 1/52 |

OTHER PUBLICATIONS

Notification of Transmittal of The International Search Report and The Written Opinion of the International Searching Authority, or the Declaration, International Application No. PCT/US2013/067672, mailing date Feb. 27, 2014.

(Continued)

*Primary Examiner* — John Fox
*Assistant Examiner* — Michael R Reid
(74) *Attorney, Agent, or Firm* — Marshall, Gerstein & Borun LLP

(57) ABSTRACT

A valve cage for a fluid flow control device includes a hollow cylindrical body, a noise abatement section, a high capacity flow section, and a transition section. The noise abatement section has a plurality of inlet openings, a plurality of outlet openings, and a plurality of tortuous flow paths extending between the inlet and outlet openings. The high capacity flow section is disposed axially adjacent to the noise abatement section and includes a first axial end, a second axial end, and a plurality of primary flow openings. The transition section is defined at an interface between the noise abatement section and the second axial end of the high capacity flow section and includes a plurality of transition openings. The transition section provides a valve cage with zero dead band between the noise abatement and high capacity flow sections when implemented into a fluid flow control device.

21 Claims, 4 Drawing Sheets

(56) References Cited

U.S. PATENT DOCUMENTS

2003/0226600 A1   12/2003   Stares et al.
2012/0273065 A1*  11/2012   Kim .............................. 137/455

OTHER PUBLICATIONS

International Preliminary Report on Patentability, Written Opinion of the International Searching Authority, International Application No. PCT/US2013/067672, mailing date May 5, 2015.

* cited by examiner

VALVE CAGE HAVING ZERO DEAD BAND BETWEEN NOISE ABATEMENT AND HIGH CAPACITY FLOW SECTIONS

CROSS-REFERENCE TO RELATED APPLICATIONS

This application claims the benefit of U.S. Provisional Application No. 61/721,773, filed Nov. 2, 2012, which is incorporated by reference herein.

FIELD OF THE DISCLOSURE

The present disclosure relates to sliding stem fluid flow control devices and, more particularly, to trim components for sliding stem fluid flow control devices.

BACKGROUND

In the process control industry, many process applications may produce unacceptable levels of noise. In control valve applications, valve trim, such as cages, may encounter a variety of harsh operating conditions. For example, in Liquid Natural Gas (LNG) distribution applications, large compressors are used to pressurize the natural gas to liquid phase prior to introduction into a distribution pipeline. It is known that during compressor operation a potentially destructive condition known as "surge" may occur. The surge point of the compressor is generally defined as the operating point where the maximum pressure at minimum stable flow can be achieved for a given compressor speed.

Operation of the compressor at or below the surge point may cause unstable operation that may cause compressor surge to occur. For example, in normal operation as gas flow through the compressor system decreases, the fluid pressure increases to maintain flow, but near the surge point, the compressor cannot impart enough momentum in the gas to continue gas flow through the compressor, causing gas flow to momentarily stop. As flow stops, the inlet pressure falls and the outlet pressure may become greater than the inlet pressure, which causes a flow reversal within the compressor (i.e., gas flows momentarily from the outlet to the inlet). The flow reversal is maintained until an adequate pressure head develops at the turbine inlet to overcome the surge condition. If compressor operation continues near the surge point, the surge condition will repeat, causing repetitive flow reversals, until the process conditions change. The flow reversals associated with compressor surge create compressor thrust reversals that can cause unstable axial and radial vibration that can damage the compressor and create high levels of noise.

To avoid compressor surge from occurring and damaging the compressor, anti-surge systems are built around the compressor. It is commonly known that anti-surge systems require high capacity anti-surge valves (i.e., large flow and high pressure valves). For example, anti-surge valves may have 22 inch ports and operate at a 550 psi pressure differential. One of ordinary skill in the art can appreciate that these flow conditions create high mass flow rates that can produce very turbulent flow and create unacceptable levels of noise. To prevent unwanted noise and damaging vibration, anti-surge valves also rely upon noise attenuating fluid pressure reduction devices (e.g., noise abating trim components). Current noise abating trim components, such as the Whisperflo® trim, available from Fisher Controls International LLC, includes a valve cage using multi-stage fluid pressure reduction designs formed from a stack of annular plates that define multiple restrictive passageways between a hollow center and an outer perimeter. Such devices have been developed for optimal operation in low pressure, mid pressure, and high pressure applications.

In some applications, it is beneficial to have the entire valve cage constructed from the stacked disc assembly such that the stacked disc assembly provides noise abatement and fluid pressure reduction throughout the entire range of travel of the related fluid flow control element. However, in other applications, noise abatement is only required throughout a portion of the travel. In these situations, when the entire valve cage is constructed from stacked discs, the stacked disc assembly actually reduces the potential overall flow capacity of the control valve.

SUMMARY

One aspect of the present disclosure provides a valve cage for a fluid flow control device. The cage generally comprises a hollow cylindrical body, a noise abatement section, a high capacity flow section, and a transition section. The hollow cylindrical body has at least one inner cylindrical surface and at least one outer cylindrical surface. The noise abatement section has a plurality of inlet openings formed in the inner cylindrical surface, a plurality of outlet openings formed in the outer cylindrical surface, and a plurality of tortuous flow paths extending between the inlet and outlet openings. The high capacity flow section is disposed axially adjacent to the noise abatement section and includes a first axial end, a second axial end, and a plurality of primary flow openings spaced circumferentially about the high capacity flow section and between the first and second axial ends. Finally, the transition section is defined at an interface between the noise abatement section and the second axial end of the high capacity flow section. The transition section includes a plurality of transition openings extending radially between the outer cylindrical surface and the inner cylindrical surface, wherein each transition opening includes a recess in the second axial end of the high capacity flow section such that the transition section provides a valve cage with zero dead band between the noise abatement and high capacity flow sections when implemented into a fluid flow control device.

Another aspect of the present disclosure provides a fluid flow control device including a valve body, a valve cage, and a control member. The valve body defines an inlet, an outlet, and a gallery disposed between the inlet and the outlet. The valve cage is mounted within the gallery. The control member is slidably disposed within the valve cage for controlling the flow of fluid through the valve body. The valve cage generally comprises a hollow cylindrical body, a noise abatement section, a high capacity flow section, and a transition section. The hollow cylindrical body has at least one inner cylindrical surface and at least one outer cylindrical surface. The noise abatement section has a plurality of inlet openings formed in the inner cylindrical surface, a plurality of outlet openings formed in the outer cylindrical surface, and a plurality of tortuous flow paths extending between the inlet and outlet openings. The high capacity flow section is disposed axially adjacent to the noise abatement section and includes a first axial end, a second axial end, and a plurality of primary flow openings spaced circumferentially about the high capacity flow section and between the first and second axial ends. Finally, the transition section is defined at an interface between the noise abatement section and the second axial end of the high capacity flow section. The transition section includes a plurality of transition openings extending radially between the outer cylindrical surface and the inner cylindrical surface, wherein each transition opening includes a recess in the second axial end of the high capacity flow section such that the transition section provides a valve cage with zero dead band between the noise abatement and high capacity flow sections when implemented into a fluid flow control device.

Still another aspect of the present disclosure provides a fluid flow control device including a valve body, a valve cage, a seat ring, and a control member. The valve body defines an inlet, an outlet, and a gallery disposed between the inlet and the outlet. The valve cage is mounted within the gallery, and the seat ring is mounted in the valve body adjacent to an end of the valve cage. The control member is slidably disposed within the valve cage and is adapted for displacement between a closed position sealingly engaging the seat ring and a fully open position spaced away from the seat ring. The valve cage includes a noise abatement section disposed adjacent to the seat ring, a high capacity flow section disposed opposite the noise abatement section from the seat ring, and a means for ensuring a continuously changing flow capacity throughout the entire range of travel of the control element between the closed position and the open position. The means for ensuring a continuously changing flow capacity is disposed at an interface between the noise abatement section and the high capacity flow rate section of the valve cage.

DETAILED DESCRIPTION

Figure 1:
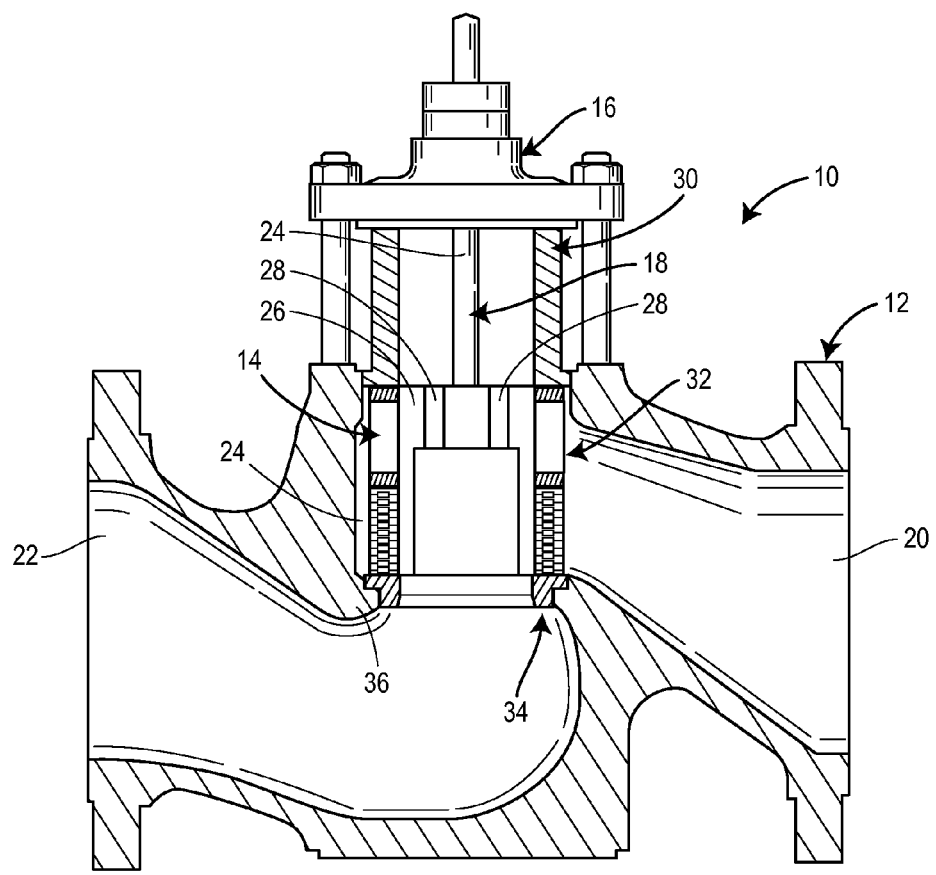
FIG. 1 is a cross-sectional side view of a fluid flow control device constructed in accordance with the principles of the present disclosure.

FIG. 1 depicts a fluid flow control device (e.g., a control valve) 10 constructed in accordance with the principles of the present disclosure. The device 10 includes a valve body 12, a trim assembly 14, a bonnet 16, and a control element 18. The valve body 12 includes an inlet 22, an outlet 20, and a gallery 24 disposed between the inlet 22 and the outlet 20. In FIG. 1, the example valve body 12 is arranged in a flow-up configuration, but could also be arranged in a flow-down configuration. As shown, the trim assembly 14 is disposed within the gallery 24 of the valve body 12 and fixed therein by the bonnet 16. The control element 18 includes a valve stem 24 and a valve plug 26. The valve stem 24 extends through the bonnet 16 to be coupled to a valve actuator (not shown) and the valve plug 26 is slidably disposed in the trim assembly 14 and is movable for controlling the flow of fluid through the valve body 12. In the disclosed version, the valve plug 26 includes through holes 28 for facilitating fluid flow through the valve plug 26 thereby providing a balanced valve plug.

The trim assembly 14 of the device 10 depicted in FIG. 1 includes a retainer 30, a valve cage 32, and a seat ring 34. The seat ring 34 is mounted on a shoulder portion 36 of the valve body 12 at a bottom of the gallery 24. The valve cage 32 is disposed above the seat ring 34, and the retainer 30 is disposed above the valve cage 32. The bonnet 16 retains the retainer 30, the valve cage 32, and the seat ring 34 in the valve body 12.

Figure 2:
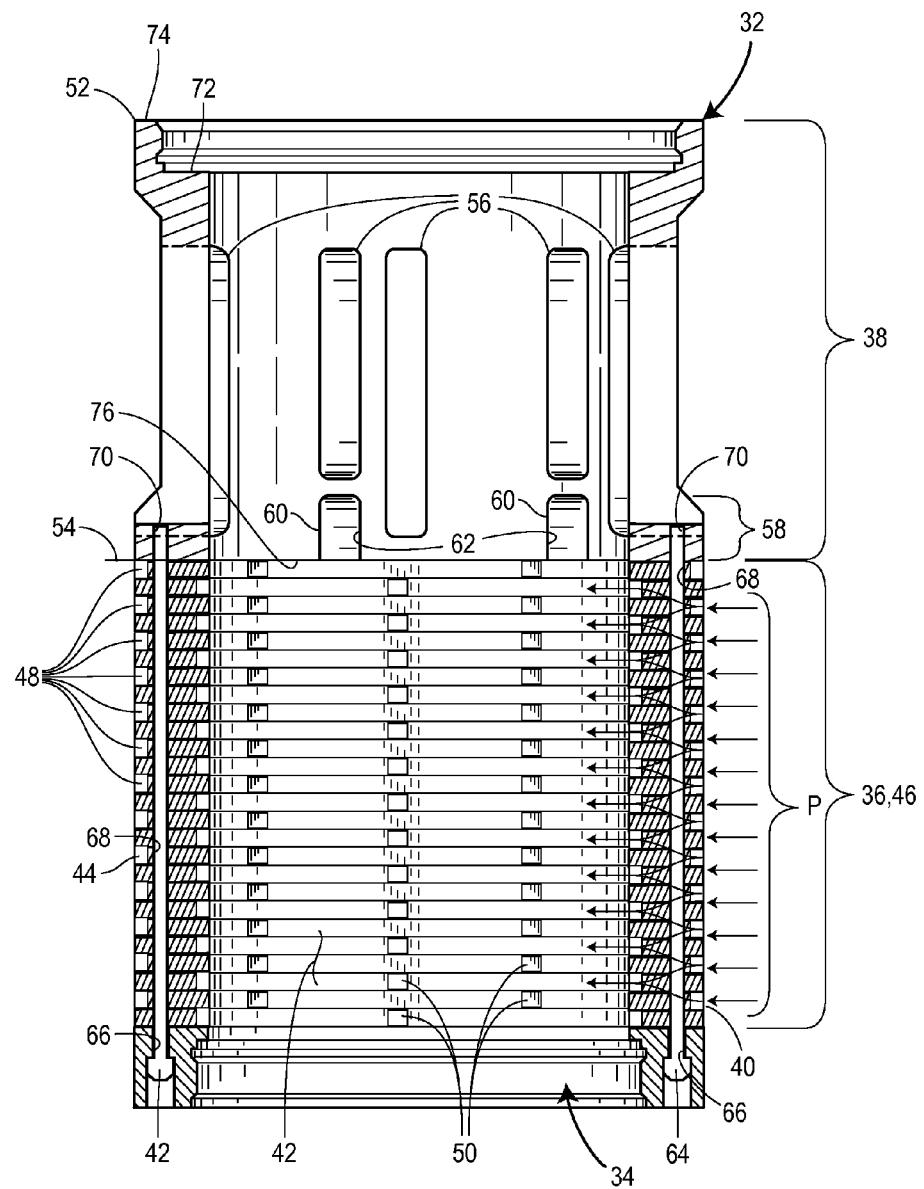
FIG. 2 is a cross-sectional side view of a valve cage constructed in accordance with the principles of the present disclosure.

Referring now to FIG. 2, the valve cage 32 of the present disclosure includes a hollow cylindrical body 40 having at least one inner cylindrical surface 42 and at least one outer cylindrical surface 44. Moreover, the valve cage 32 includes a dual-component assembly having a noise abatement section 36 and a high capacity flow section 38. In the depicted version, the noise abatement section 36 is positioned below the high capacity flow section 38 and connected thereto with a plurality of fasteners 64. Specifically, the plurality of fasteners 64 in this version extend through openings 66 in the seat ring 34, up through bores 68 in the noise abatement section 36 and are threaded into threaded openings 70 in the high capacity flow section 38. This is just one example, and other versions could be constructed differently.

The noise abatement section 36 of the presently disclosed valve cage 32 includes a plurality of stacked discs 46. The stacked discs 46 are generally annular in shape and contoured such that when assembled in a stack, as depicted, the noise abatement section 36 of the valve cage 32 includes a plurality of inlet openings 50 formed in the inner cylindrical surface 42 of the cylindrical body 40, a plurality of outlet openings 48 formed in the outer cylindrical surface 44 of the hollow cylindrical body 40, and a plurality of tortuous flow paths P extending between the inlet openings 50 and outlet openings 48. As is known, the inlet openings 50 can generally be in fluid communication with one or more of the outlet openings 48 by way of a plurality plenum chambers (not shown) formed by the stacked plates between the inner and outer cylindrical surfaces 42, 44 of the valve cage 32. So configured, the flow paths P are tortuous and can be designed to create a pressure drop in the plenum chambers and then a pressure increase at the outlet openings 48, which thereby reduces noise caused by fluids passing through the noise abatement section 36 of the valve cage 32. While the openings 50 in the inner cylindrical surface 42 of the noise abatement section 36 are described herein as being the "inlet" openings and the openings 48 in the outer cylindrical surface 44 are described as being the "outlet" openings, this is simply because the present version of the valve 12 is described as being arranged in the flow-up configuration. When arranged in the flow-down configuration, openings 48 can serve as the "inlet" openings and openings 50 can serve as the "outlet" openings. Thus, the terms "inlet" and "outlet" are not indicative of any required operational configuration, but rather, merely intended to distinguish between the various openings.

The high capacity flow section 38 of the valve cage 32 depicted in FIG. 2 is positioned above the noise abatement section 36, as mentioned, and includes a one-piece cylindrical form having a first axial end 52, a second axial end 54, and a plurality of primary flow openings 56. The first axial end 52 includes a shoulder surface 72 for receiving the retainer 30 of the trim assembly 14 shown in FIG. 1, for example, and a terminal end surface 74 that includes a planar annular surface. The second axial end 54 includes a terminal end surface 76 that includes a contoured form, as will be described.

The primary flow openings 56 are spaced circumferentially about the high capacity flow section 38 and each is located between the first and second axial ends 52, 54. That is, each of the primary flow openings 56 is completely bounded by the material that makes up the high capacity flow section 38 of the valve cage 32. In the version disclosed in FIG. 2, which is also depicted in two-dimensional plan view in FIG. 3, each of the primary flow openings 56 includes an elongated slot passing through the high capacity flow section 38 of the valve cage 32 from the outer cylindrical surface 44 to the inner cylindrical surface 42. The elongated flow openings 56 extend longitudinally along the axial dimension of the valve cage 32 in this version.

Figure 3:
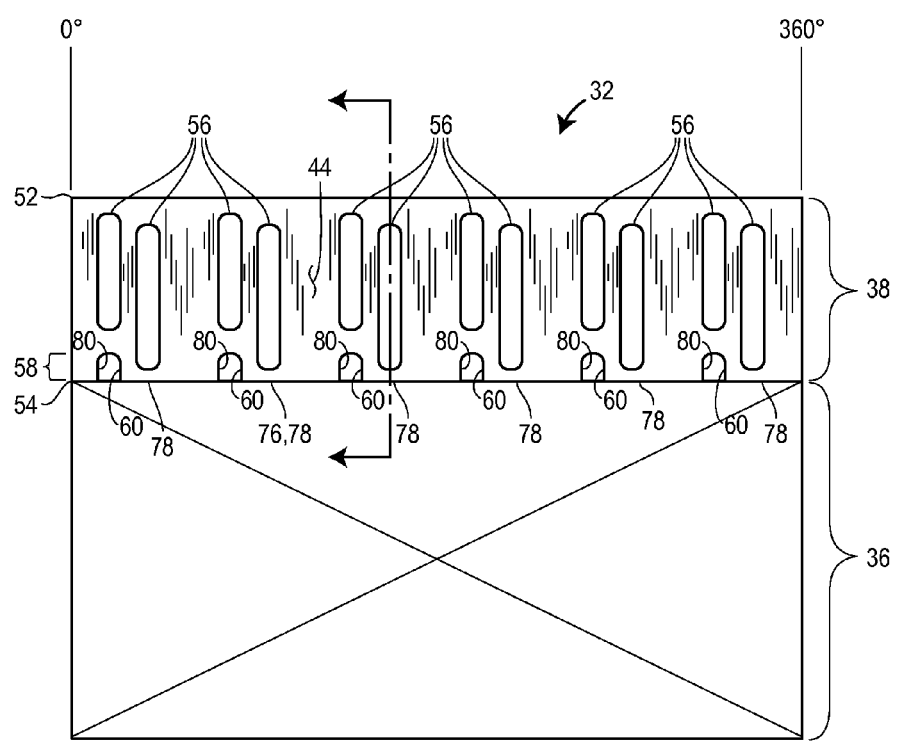
FIG. 3 is a planar two-dimensional view of the outer cylindrical surface of one version of the valve cage of FIG. 2, illustrating a noise abatement section thereof schematically.

As also shown in FIGS. 2 and 3, the present version of the valve cage 32 includes a transition section 58 disposed at the interface between the noise abatement section 36 and the second axial end 54 of the high capacity flow section 38. In this version, the transition section 58 actually includes a portion of the high capacity flow section 38 of the valve cage 32 adjacent to the second axial end 54. The transition section 58, as shown, includes a plurality of transition openings 60 extending radially through the high capacity flow section 38 from the outer cylindrical surface 44 to the inner cylindrical surface 42 of the valve cage 32. Moreover, each transition opening 60 includes a recess that is formed in the second axial end 54 of the high capacity flow section 38. Said another way, the terminal end surface 76 of the second axial end 54 of the high capacity flow section 38 of this version is not completely planar as is the terminal end surface 74 at the first axial end 52 of the high capacity flow section 38, but rather, it includes a plurality of notches 62 extending axially into the body of the high capacity flow section 38 from the second axial end 54 toward the first axial end 52. As such, the terminal end surface 76 of the second axial end 54 of the high capacity flow section 38 includes a plurality of planar portions 78 (FIG. 3), each extending partly around the high capacity flow section 38, and separated by a plurality of inwardly curved portions 80 (FIG. 3), which define the transition openings 60 or notches 62, thereby defining the contoured terminal end surface 76. In the form depicted in FIGS. 2 and 3, the transition openings 60 or notches 62 constitute portions of elongated slots extending axially along the high capacity flow section 38.

Still referring to FIG. 3, the primary flow openings 56 and transition openings 60 of the present version of the valve cage 32 are arranged and configured in such a way that fluid can communicate from the inner cylindrical surface 42 to the outer cylindrical surface 44 (or vice versa) throughout the entire axial dimension of the transition section 58. Said another way, the transition section 58 of the disclosed version of the valve cage 32 does not include a dead band, i.e., a solid band of material extending completely and uninterrupted around the circumference of the cage 32. This is achieved by including the transition openings 60, which extend from the terminal end surface 76 of the second axial end 54 into the high capacity section 38 toward the first axial end 52, alongside and overlapping with the primary flow openings 56. That is, in the version depicted, the transition openings 60 overlap with at least some of the primary flow openings 56 in the axial direction of the hollow cylindrical body of the high capacity flow section 38. So configured, any horizontal cross-section taken through the transition section 58 or the high capacity flow section 38 in the region of the primary flow openings 56, must always pass through all of the transition openings 60, some or all of the primary flow openings 56, or some combination of the transition openings 60 and some of the primary flow openings 56. This overlapping, or interleaved, configuration of the openings 56, 60 ensures that as the control element 18 of the control valve 12 moves through the transition section 58, the flow capacity of fluid flowing through the valve 10 is continuously adjusted, i.e., increased or decreased.

Figure 4:
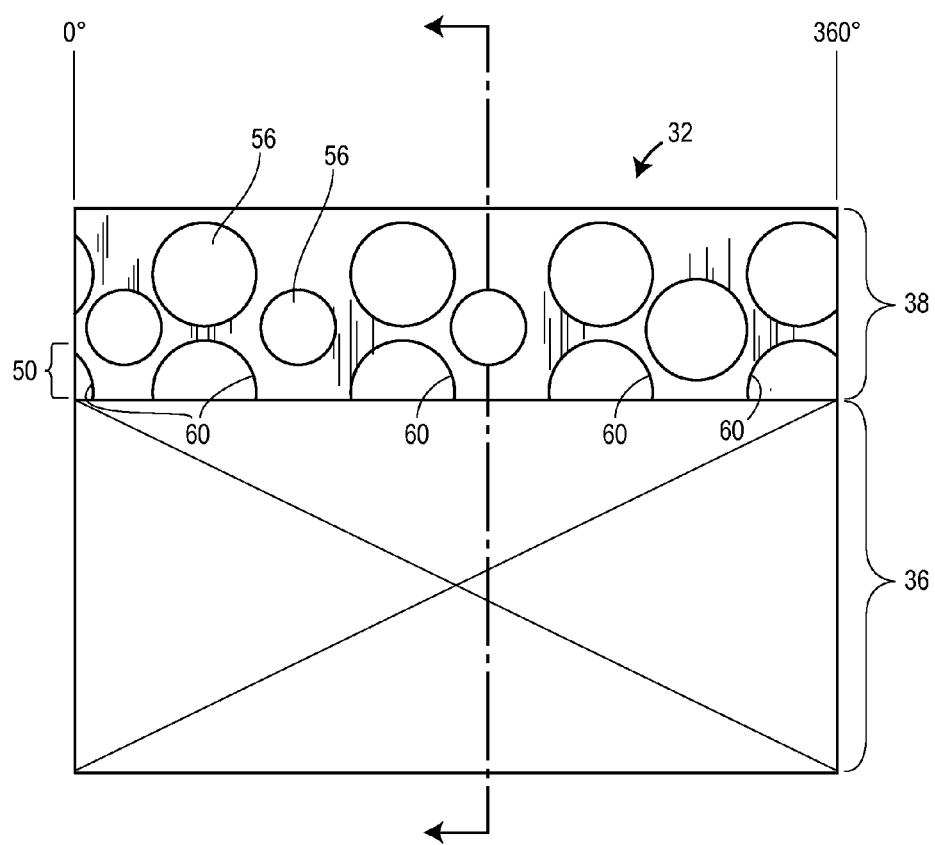
FIG. 4 is a planar two-dimensional view of the outer cylindrical surface of another version of the valve cage of FIG. 2, illustrating a noise abatement section thereof schematically.

While the valve cage of FIGS. 2 and 3 includes primary flow openings 56 and transition flow openings 60 that include elongated slots and portions of elongated slots, respectively, this is merely one example of a high capacity flow section 38. FIG. 4 depicts another example, wherein the high capacity flow section 38 of the valve cage 32 includes primary flow openings 56 and transition flow openings 60 that are circular openings and partial circular openings, respectively. Other than the shape of these openings 56, 60, the remaining features of the valve cage 32 of FIG. 4 are the same as the valve cage of FIGS. 2 and 3 and, therefore, all of the details need not be repeated. One key feature for ensuring that the valve cage 32 does not include a dead band is the fact that the transition openings 60 extend axially into the high capacity flow section 48 from the terminal end surface 76 of the second axial end 54 toward the first axial end 52, and also that they overlap with at least some of the primary flow openings 56 in the axial direction of the valve cage 32. As discussed above with reference to FIGS. 2 and 3, this configuration ensures that as the control element 18 of the control valve 12 moves through the transition section 58, the flow capacity of fluid flowing through the valve 10 is continuously adjusted, i.e., increased or decreased.

In view of the foregoing, the valve cages 32 of the present disclosure are designed to provide a seamless transition section 58 between the noise abatement section 36 and the high capacity flow section 38 where fine adjustments in the position of the control element 18 result in associated adjustments in the overall flow capacity of the valve 10. For example, as the control element 18 moves from a closed position to an open position, the capacity of fluid flow through the valve 10 will increase generally continuously in proportion to the amount of travel of the valve plug 26. This continuous adjustability provides for a highly accurate and predictable device. Based on this, it should be understood that any one of the transitions sections 58 described herein, as well as equivalents thereof, can be considered to be a means for ensuring a continuously changing flow capacity throughout the entire range of travel of the control element 18 between the closed position and the open position.

While the valve cages 32 discussed herein have only been disclosed as having one noise abatement section 36 and one high capacity flow section 38, other versions could include more of either or both sections, if desired to achieve any particular objective. For example, another version could have two or more of each of the noise abatement and high capacity flow sections 36, 38 interlaced along the axial dimension of the valve cage 32.

Although not expressly discussed above, it should be appreciated from the drawings that the disclosed versions of the valve cages 32 include noise abatement sections 36 that constitute a predetermined percentage of the overall axial length of the valve cage 32. For example, in some versions, the noise abatement section 36 can constitute approximately 60% of the overall axial length of the cage 32. In other versions, the noise abatement section 36 can constitute approximately 10%, approximately 20%, approximately 30%, approximately 40%, approximately 50%, approximately 70%, approximately 80%, approximately 90%, or generally any other percentage of the overall axial length of the valve cage 32, in order to achieve the desired objective for any given fluid flow control application.

Furthermore, while the version of the valve cage described herein includes threaded fasteners 64 securing the noise abatement section 36 to the high capacity flow section 38, alternative versions could include other means to connect these components such as welding, adhesive, external clamping, etc. In one version, the high capacity flow section 38 and noise abatement section could include threads, for example, in the region of the transition section 58 such that the two sections are threaded together. One advantage of the threaded fasteners 64 however is that they do not impact the utility of the transition openings 60.

While certain representative versions of valve cages and control valves having valve cages have been described herein for purposes of illustrating the invention, it will be apparent to those skilled in the art that various changes in the devices disclosed may be made without departing from the spirit and scope of the invention, which is defined by the following claims and is not limited in any manner by the foregoing description.

We claim:

1. A valve cage for a fluid flow control device, the cage comprising:
    a hollow cylindrical body having at least one inner cylindrical surface and at least one outer cylindrical surface;
    a noise abatement section of the hollow cylindrical body, the noise abatement section comprising a plurality of stacked discs collectively defining a plurality of inlet openings formed in the inner cylindrical surface or the outer cylindrical surface, a plurality of outlet openings formed in the other of the inner cylindrical surface and the outer cylindrical surface, and a plurality of tortuous flow paths extending between the inlet and outlet openings;
    a high capacity flow section of the hollow cylindrical body removably connected and disposed axially adjacent to the noise abatement section, the high capacity flow section comprising a one-piece cylindrical form having a first axial end, a second axial end, and a plurality of primary flow openings spaced circumferentially about the high capacity flow section and between the first and second axial ends; and
    a transition section of the hollow cylindrical body defined at an interface between the noise abatement section and the second axial end of the high capacity flow section, the transition section including a plurality of transition openings extending radially between the outer cylindrical surface and the inner cylindrical surface, each transition opening including a recess in the second axial end of the high capacity flow section such that the transition section provides a valve cage with zero dead band between the noise abatement and high capacity flow sections when implemented into a fluid flow control device.

2. The valve cage of claim 1, wherein the transition openings overlap with at least some of the primary flow openings in the axial direction of the hollow cylindrical body.

3. The valve cage of claim 1, wherein the primary flow openings are circular openings and the transition openings are portions of circular openings.

4. The valve cage of claim 1, wherein the primary flow openings are elongated slots and the transition openings are portions of elongated slots.

5. The valve cage of claim 4, wherein the elongated slots and portions of elongated slots have longitudinal dimensions that extend in an axial direction of the hollow cylindrical body.

6. The valve cage of claim 1, further comprising one or more fasteners connecting the noise abatement section to the high capacity flow section.

7. The valve cage of claim 6, wherein each of the fasteners extends axially through the noise abatement section and threadably engages the high capacity flow section.

8. The valve cage of claim 1, wherein the noise abatement section comprises a predetermined percentage of the overall axial length of the hollow cylindrical body, the predetermined percentage selected from the group consisting of approximately 10%, approximately 20%, approximately 30%, approximately 40%, approximately 50%, approximately 60%, approximately 70%, approximately 80%, and approximately 90%.

9. The valve cage of claim 1, wherein the noise abatement section comprises approximately 60% of the overall length of the hollow cylindrical body.

10. A fluid flow control device comprising:
    a valve body defining an inlet, an outlet, and a gallery disposed between the inlet and the outlet;
    a valve cage mounted within the gallery; and
    a control member slidably disposed within the valve cage for controlling the flow of fluid through the valve body, wherein the valve cage comprises:
    a hollow cylindrical body having at least one inner cylindrical surface and at least one outer cylindrical surface,
    a noise abatement section of the hollow cylindrical body, the noise abatement section comprising a plurality of stacked discs collectively defining a plurality of inlet openings formed in the inner cylindrical surface or the outer cylindrical surface, a plurality of outlet openings formed in the other of the inner cylindrical surface and the outer cylindrical surface, and a plurality of tortuous flow paths extending between the inlet and outlet openings,
    a high capacity flow section of the hollow cylindrical body removably attached and disposed axially adjacent to the noise abatement section, the high capacity flow section comprising a one-piece cylindrical form having a first axial end, a second axial end, and a plurality of primary flow openings spaced circumferentially about the high capacity flow section and between the first and second axial ends, and
    a transition section of the hollow cylindrical body defined at an interface between the noise abatement section and the second axial end of the high capacity flow section, the transition section including a plurality of transition openings extending radially from the outer cylindrical surface to the inner cylindrical surface, each transition opening including a recess in the second axial end of the high capacity flow section such that the transition section provides a valve cage with zero dead band between the noise abatement and high capacity flow sections when implemented into a fluid flow control device.

11. The device of claim 10, wherein the transition openings overlap with at least some of the primary flow openings in the axial direction of the hollow cylindrical body.

12. The device of claim 10, wherein the primary flow openings are circular openings and the transition openings are portions of circular openings.

13. The device of claim 10, wherein the primary flow openings are elongated slots and the transition openings are portions of elongated slots.

14. The device of claim 13, wherein the elongated slots and portions of elongated slots have longitudinal dimensions that extend in an axial direction of the hollow cylindrical body.

15. The device of claim 10, further comprising one or more fasteners connecting the noise abatement section to the high capacity flow section.

16. The device of claim 15, wherein each of the fasteners extends axially through the noise abatement section and threadably engages the high capacity flow section.

17. The device of claim 10, wherein the noise abatement section comprises a predetermined percentage of the overall axial length of the hollow cylindrical body, the predetermined percentage selected from the group consisting of approximately 10%, approximately 20%, approximately 30%, approximately 40%, approximately 50%, approximately 60%, approximately 70%, approximately 80%, and approximately 90%.

18. The device of claim 10, wherein the noise abatement section comprises approximately 60% of the overall length of the hollow cylindrical body.

19. The device of claim 10, wherein the valve body is arranged in a flow-up configuration.

20. The device of claim 10, wherein the valve body is arranged in a flow-down configuration.

21. A fluid flow control device comprising:
   a valve body defining an inlet, an outlet, and a gallery disposed between the inlet and the outlet;
   a valve cage mounted within the gallery;
   a seat ring mounted in the valve body adjacent to an end of the valve cage; and
   a control member slidably disposed within the valve cage, the control member adapted for displacement between a closed position sealingly engaging the seat ring and a fully open position spaced away from the seat ring, wherein the valve cage includes a noise abatement section comprising a plurality of stacked discs disposed adjacent to the seat ring, a high capacity flow section comprising a one-piece cylindrical form removably connected to the noise abatement section and disposed opposite the noise abatement section from the seat ring, and a means for ensuring a continuously changing flow capacity throughout the entire range of travel of the control element between the closed position and the open position, the means for ensuring a continuously changing flow capacity disposed at an interface between the noise abatement section and the high capacity flow rate section of the valve cage.

\* \* \* \* \*